United States Patent Office 3,309,289
Patented Mar. 14, 1967

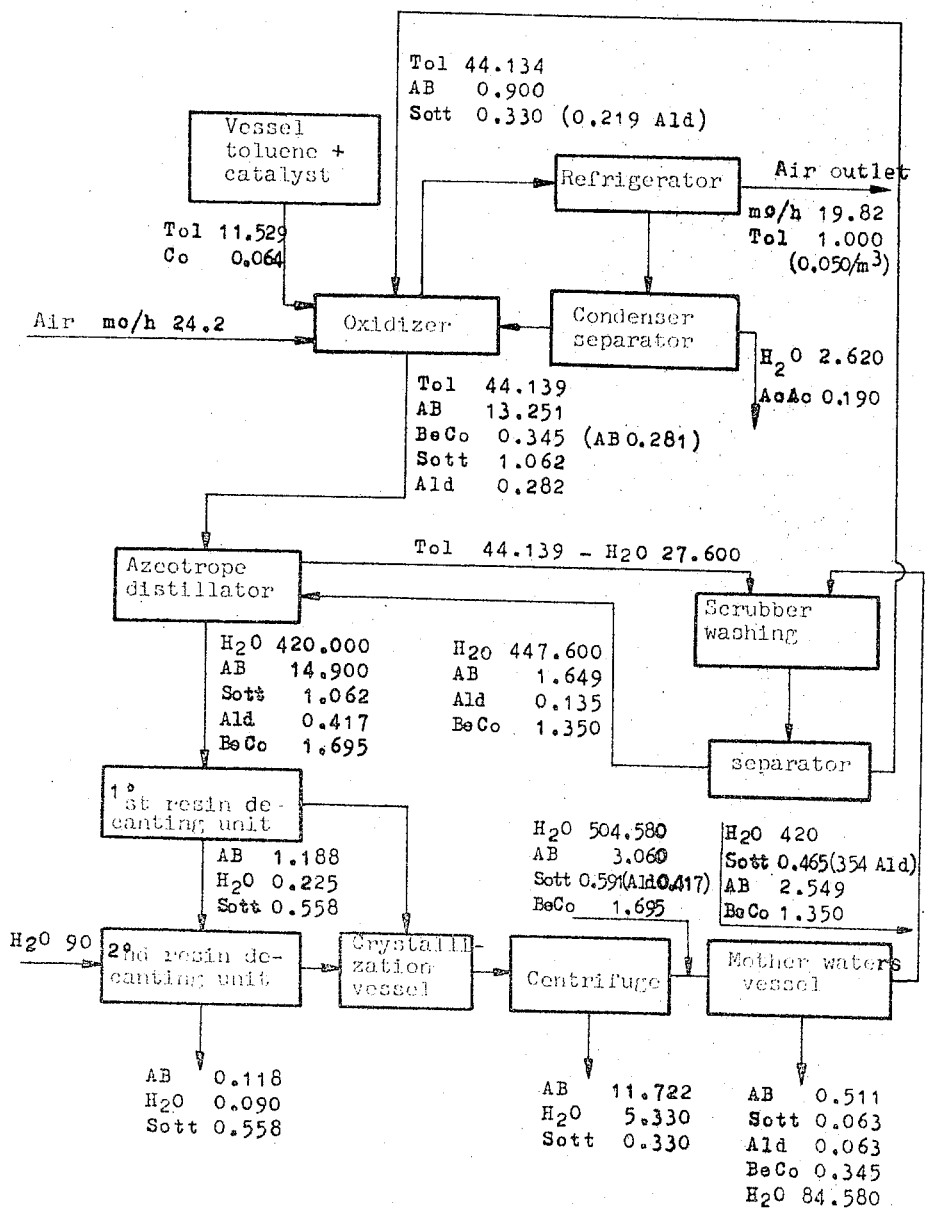

3,309,289
RECOVERY OF BENZOIC ACID BY DISTILLATION IN PRESENCE OF EXCESS WATER
Giuseppe Messina, Limbiate, Werner Muench, Cesano Maderno, and Roberto Mattone, Seveso, Italy, and Luigi Notarbartolo, deceased, late of Milan, Italy, by Enza Pascalino, administratrix, and Paola Notarbartolo, heiress, assignors to Snia Viscosa Societá Nazionale Industria Applicazioni Viscosa S.p.A., Milan, Italy, a company of Italy
Filed Oct. 8, 1962, Ser. No. 229,234
Claims priority, application Italy, Oct. 11, 1961, 18,287/61
7 Claims. (Cl. 203—48)

The object of this invention is a process for the preparation of benzoic acid, and more particularly the separation of benzoic acid from the product obtained by the oxidation of toluene.

The process according to this invention is more particularly applicable to the separation of benzoic acid from the product obtained by oxidizing toluene according to the processes which form the subject matter of our copending applications No. 207,822 and 209,272, now abandoned, but is not limited thereto, as it can be advantageously applied to the separation of benzoic acid from products obtained by oxidizing toluene by methods different from those described in the aforementioned copending applications.

The oxidation product contains, besides the benzoic acid formed, a considerable amount of unreacted toluene, as well as certain oxidation by-products which have been only partially chemically identified, among them benzaldehyde. Generally, the toluene oxidation products to which the present invention is most advantageously applicable, are solutions in toluene having compositions in the following ranges: benzoic acid, from 20 to 35%; benzaldehyde, from 0.2 to 0.5%; other by-products, from 1.5 to 3%. All the percentages in this specification and in the claims are by weight.

The process of this invention comprises the following steps:

(a) Water is added to the solution of benzoic acid and impurities in toluene, the amount of water added being preferably from 10 to 15 times, by weight, the amount of the solution in toluene, depending on the concentration of this latter. Preferably, as will appear hereinafter, the water thus added is recovered from successive steps of the operating cycle and contains small amounts of benzoic acid and of catalyst, the latter being in the form of cobalt benzoate whenever a cobalt catalyst has been employed; but this is not a necessary feature of the process.

Preferably, according to this invention the excess of water employed is sufficient to form a solution of benzoic acid at a concentration between 3.0% and 5.0% after the toluene-water azeotrope has been distilled off.

The amount of water required for the distillation generally varies between 35 and 45% of the toluene contained in the reaction product to be processed, and is generally about 38%.

Preferably, the solution in toluene deriving from the oxidation of toluene, is fed into a distillation unit of any suitable type and water is concurrently added in measured amounts. The water-toluene azeotrope distills off and the distillation residue is a hot aqueous solution of benzoic acid at a concentration of the acid between about 3.0 and 5.0% and preferably between 3.5 and 3.8% which solution still contains benzaldehyde and reaction by-products in the form of water-insoluble oils having a specific weight higher than that of the aqueous solution, and further contains the catalyst, generally as cobalt benzoate.

(b) The aqueous benzoic acid solution is decanted while hot, at a temperature not below 90° C. and preferably between 93 and 95° C.

Resinous by-products which entrain therewith a small amount of benzoic acid (generally about 60% of the weight of the resins) settle on the bottom of the decanting unit employed, which is of any convenient type, while an aqueous benzoic acid solution, containing however the soluble impurities, such as benzaldehyde and cobalt benzoate, is decanted off.

Preferably, the benzoic acid contained in the resins is recovered in any convenient manner. It has been found advantageous to wash the resins with hot water under energetic stirring in an extractor, thereby obtaining a benzoic acid solution which contains small amounts of resins, which can be separated by a further decantation. The benzoic acid solution or solutions obtained by washing the resins, are preferably added to the solution deriving from the first decantation. The solution is treated as follows.

(c) The benzoic acid solution which is generally nearly saturated (concentration between 3.5 and 3.8%) is crystallized in one or more stages.

(d) The crystallization product centrifuged, and after drying, constitutes the pure benzoic acid product obtained by the process according to this invention, the amount of said product being between 92 and 96% of the benzoic acid originally contained in the oxidation product. Said benzoic acid still contains small tolerable percentages of by-products.

(e) The mother waters of the crystallization thus separated are added (after discharging an amount which varies generally between 1/5 and 1/10 of their total volume) to the raw product of the oxidation of toluene, to allow the distillation of a water-toluene azeotrope, as hereinbefore described. Preferably, however, said addition is carried out immediately after a treatment which has important consequences on the subsequent utilization of the benzoic acid. The mother waters still contain small amounts of benzoic acid, catalyst (generally as cobalt benzoate), and soluble impurities, mainly benzaldehyde. They are preferably preheated by using them as a cooling means in contact with the water-toluene azeotrope vapours originating from the distillation. The solution cools the vapours and causes them to condense. The condensate separates into two layers, the top layer being toluene which extracts part of the benzoic acid and the benzaldehyde from the mother waters and is generally recovered by feeding it anew to the oxidation, from which the reaction mixture treated according to this process is obtained. The heated mother waters, which still contain the water of the azeotrope and the excess water distilled off, are added to the solution in toluene produced in the oxidation, as hereinbefore stated.

It has been found that by operating in the preferred manner aforesaid, the mother waters do not become enriched in benzaldehyde, since a major portion of the aldehyde produced (for instance 75–80%) is recycled together with the recovered toluene. This is important from various viewpoints. The aldehyde is a product to be recovered as it is useful as an intermediate in the production of benzoic acid. On the other hand, since the benzoic acid has important applications which involve a successive hydrogenation, the aldehyde should not accompany the acid because it constitutes a powerful poison in the hydrogenation stage. Since the solubility of benzaldehyde in water is limited to about 0.33%, the mother waters, if they were recycled without the aforesaid preheating, would become enriched in benzaldehyde at each cycle to an extent of from 13 to 20 gr. of benzaldehyde per kg. of benzoic acid produced (since this is the amount which is formed in one oxidation cycle). When a concentration of 0.33% has been reached, each successive amount of benzoic aldehyde would separate together with the benzoic acid during the crystallization and the acid would be poisoned thereby and rendered unsuitable for a succeeding hydrogenation. The countercurrent treatment of the mother waters with the water-toluene azeotrope vapours, has therefore the surprising effect of scrubbing—so as to speak—the mother waters, thereby maintaining the concentration of benzaldehyde at a low enough level not to constitute a poison in the process and feeding the aldehyde back to the oxidation stage in which it constitutes on the contrary a valuable recovery, and this without expense but on the contrary with a useful saving of heat.

Consequently, the mother waters thus purified may be added without further treatment to the solution in toluene produced in the oxidation, to initiate the process and cycle hereinbefore described.

A non-limitative embodiment of the process according to this invention will now be described, with the aid of the appended drawing which shows a flow-sheet of the process in the steady state condition. It is assumed that the starting product is obtained from the oxidation of toluene in the presence of a catalyst constituted by cobalt enanthate. Although the oxidation in the presence of cobalt enanthate is not a part of this invention and it forms the subject matter of our co-pending application No. 207,822, nevertheless the oxidation phase will be initially described more fully to clarify the process.

400 kg. of toluene plus a catalyst constituted by cobalt enanthate in an amount of 0.115% of cobalt based on the toluene are loaded into a 500 lt. reactor.

The oxidation is initiated by progressively feeding air up to a maximum of 24.2 mc./h. and maintaining the reactor at a temperature of 145° C. When the benzoic acid concentration in the reactor is 23%, the continuous process is initiated by loading fresh toluene and discharging oxidized mixture. The catalyst concentration is maintained constant in the mass by continuously feeding a solution of catalyst and toluene.

The weights and volumes of the agents employed hereinafter mentioned and shown on the flow-sheet, should be understood as being weights and volumes referred to one hour, although the reference to the time has been omitted for the sake of simplicity, viz. they signify flow rates.

A recycle mixture rich in toluene and consisting of kg. 44.139 toluene, kg. 0.900 of benzoic acid and kg. 0.330 of by-products, including kg. 0.215 of benzaldehyde, is fed into the oxidation vessel.

Said recycle mixture is obtained in the manner hereinafter explained.

Kg. 11.529 of fresh toluene containing kg. 0.064 of cobalt as cobalt enanthate are also added. The flow rate of air at the inlet is mc. 24.2 and at the outlet is mc. 19.82.

After the oxidation has taken place, the oxidized solution is continuously discharged, said solution containing kg. 13.251 of benzoic acid produced in the oxidation, consisting of kg. 13.252 as acid plus kg. 0.281 as cobalt benzoate, from which kg. 0.900 already contained in the recycle mixture should be subtracted. The total production is therefore kg. 12.630. Taking into account that the air which is discharged from the reaction space after the oxidation entrains 50.5 gr. of toluene per mc., the toluene consumed is calculated as kg. 11.529 minus kg. 1, viz. kg. 10.530, corresponding to a consumption of kg. 0.835 of toluene per kg. of benzoic acid produced, and to a yield of 89.8% of theory. On the contrary, the yield calculated on the overall oxidation product, including both benzoic acid and by-products, is 97% of theory. The purification of benzoic acid is effected according to the principles hereinbefore described, particularly in the following manner.

Kg. 447.600 of recycle water, obtained as will be described hereinafter, containing kg. 1.649 of benzoic acid and kg. 0.135 of benzaldehyde (0.3% of the water) are added to the oxidized solution discharged. Thereafter a distillation is carried out at 90–92° C., said temperature being higher than the boiling point of the toluene-water azeotrope, whereby excess water is distilled off together with the azeotrope.

Thus kg. 44.139 of toluene and kg. 27.600 of water are obtained. The toluene-water azeotrope vapours and the excess water are cooled by washing with the mother waters of the crystallization of benzoic acid and condensed. From the liquid mass obtained, which comprises the condensate of said vapours and the mother water employed to scrub the same, there are obtained a layer of kg. 44.139 of toluene containing kg. 0.900 benzoic acid and kg. 0.330 by-products (kg. 0.219 of benzaldehyde), which is recycled in the oxidation vessel, as stated hereinbefore. The aqueous mass is added to the oxidized solution as stated hereinbefore. Said mass, as has been stated, contains kg. 447.600 of water, which comprises kg. 27.600 of water contained in the vapours produced in the distillation.

The distillation residue, consisting of an aqueous solution of benzoic acid at about 3.5% and other substances, is decanted. In the first decanting unit a sludge is separated which contains 8% of the benzoic acid in the cycle and 53% of by-products. The decantation takes plates at 94° C. Thereafter the sludge passes to the second decanting unit, wherein more water is added and a second sludge, less rich in benzoic acid (0.8% of the total), is obtained. The two decantates are passed to the crystallization and centrifugation stages, carried out with any suitable apparatus.

Kg. 11.722 of crystallized benzoic acid are obtained, with a purification yield of 93%. The yield in crystallized benzoic acid calculated on the toluene is 84% of the theory. The benzoic acid still contains a certain amount of by-products and precisely kg. 0.330 of by-products and is therefore 97% pure. The crystallization mother waters consist of kg. 504.580 of water, containing kg. 0.591 of by-products (benzaldehyde 0.417), kg. 3.060 of benzoic acid and kg. 1.695 of cobalt benzoate. Said mother waters, after discharging about ⅙ of their volume, are employed, as hereinbefore stated, to scrub the toluene-water azeotrope and excess water vapours obtained by distillation. The discharge contains benzoic acid, both dissolved as free acid and in the form of benzoate and further kg. 0.063 (22% of the total) of benzaldehyde which is eliminated from the system.

The benzoic acid dissolved and that present as cobalt benzoate can be recovered with sufficiently good yields (about 90%) thus raising the benzoic acid yield based on toluene to 89% of theory.

It is understood that the foregoing embodiment has been described purely for the sake of illustration and is not limitative, and particularly that the quantitative values, the flow rates, the percentages therein specified may be varied, and that any suitable type of apparatus may be chosen to carry out the process according to this invention. The composition of the raw starting material obtained by oxidizing toluene may also vary. The process followed to oxidize toluene is not a part of the invention and may be any suitable process. In particular, the catalyst may vary; and even when a cobalt catalyst is used, it may be different from the cobalt enanthate mentioned in the description. The adaptations required by variations in the starting raw material may be effected, within the scope of the invention, by persons skilled in the art.

What is claimed is:

1. A process for recovering benzoic acid in purified form from a raw material obtained by partial oxidation of toluene, and which includes benzoic acid in solution in toluene, comprising the steps
    (a) of adding water to said raw material in an amount in excess of that required to form at atmospheric pressure an azeotrope with toluene, (b) distilling said mixture at a temperature higher than the boiling point of an azeotropic mixture of water and toluene to obtain vapors richer in water than an azeotropic vapor of water and toluene, and to leave as residue an aqueous solution of benzoic acid, and (c) crystallizing the benzoic acid in the last-named solution to separate solid purified benzoic acid therefrom.

2. The process for recovering benzoic acid in purified form from a raw material obtained by partial oxidation of toluene, and which includes benzoic acid in solution in toluene, comprising the steps (a) of adding water to said raw material in an amount in excess of that required to form at atmospheric pressure an azeotrope with toluene, (b) distilling said mixture at a temperature higher than the boiling point of an azeotropic mixture of water and toluene to obtain vapors richer in water than an azeotropic vapor of water and toluene, and to leave as residue an aqueous solution of benzoic acid, and crystallizing the benzoic acid in the last-named solution to separate solid purified benzoic acid therefrom, the excess of water employed being in an amount to obtain a mixture which includes more than 20% of water and less than 80% of toluene.

3. The process for recovering benzoic acid in purified form from a raw material obtained by partial oxidation of toluene, and which includes benzoic acid in solution in toluene, comprising the steps (a) of adding water to said raw material in an amount in excess of that required to form at atmospheric pressure an azeotrope with toluene, (b) distilling said mixture at a temperature higher than the boiling point of an azeotropic mixture of water and toluene to obtain vapors richer in water than an azeotropic vapor of water and toluene, and to leave as residue an aqueous solution of benzoic acid, and (c) crystallizing the benzoic acid in the last-named solution to separate solid purified benzoic acid therefrom, the distillation step being carried on at a temperature between 90° C. and 95° C. to remove overhead, as vapors, the water-toluene azeotrope and additional water.

4. The process of claim 3, wherein the solid benzoic acid obtained is separated from the mother liquors by centrifugation.

5. The process of claim 3, wherein the said raw material consists of a solution in toluene of benzaldehyde and by-products besides benzoic acid, the mother liquor including benzaldehyde is recovered from said crystallization step, and the vapors resulting from said distilling step are also recovered, said mother liquor is directly contacted with said vapors whereby said vapors condense and a liquid mass is formed, said liquid mass is separated into two superimposed layers, the upper of which consists of a solution in toluene of benzoic acid, benzaldehyde and by-products, the second-named solution is recovered, and fresh toluene and an oxidation catalyst are added to said second-named solution, and the third solution thus obtained, the toluene and the catalyst are fed to raw material obtained by partial oxidation of toluene to oxidize at least part of said benzoic aldehyde to benzoic acid.

6. The process of claim 5, wherein the lower layer of said two layers includes the waters of the major portion of said mother liquor and of said condensed vapors, and said lower layer is recovered and is added to said raw material thereby to add water thereto.

7. A process according to claim 3, further comprising contacting a major portion of the mother waters obtained from the crystallization of the benzoic acid aqueous solution with the vapors obtained from the distillation of the toluene-water azeotrope, whereby said vapors are condensed and a liquid mass is obtained, allowing said liquid mass to separate into two layers, the lower layer consisting of an aqueous solution containing the water of the aforesaid major portion of said mother waters and the water contained in the distilled vapors, and adding said aqueous solution to the starting raw material, thereby supplying a major portion of the water added to said starting raw material.

References Cited by the Examiner

UNITED STATES PATENTS

| | | | |
|---|---|---|---|
| 1,547,893 | 7/1925 | Bergius | 202—185.2 |
| 2,437,649 | 3/1948 | Milner | 203—85 |
| 2,507,632 | 5/1950 | Hickman | 202—185.2 |
| 2,702,784 | 2/1955 | Rossi | 203—85 |
| 2,887,511 | 5/1959 | Wasley | 260—525 X |
| 2,936,267 | 5/1960 | Fernholz et al. | 260—525 X |
| 3,078,303 | 2/1963 | Sweeney | 203—48 |
| 3,081,348 | 3/1963 | Spacht | 203—29 |
| 3,092,658 | 6/1963 | Baldwin et al. | 260—525 |
| 3,115,520 | 12/1963 | Baldwin et al. | 260—525 |
| 3,119,860 | 1/1964 | Kalfadelis et al. | 260—525 |

FOREIGN PATENTS 802,117 10/1958 Great Britain.

OTHER REFERENCES

L. H. Horsley: Azeotropic Data, Washington, D.C., 1952 (page 11 and pages 318–322 relied upon).

Weisberg: Technique of Organic Chemistry, vol. LV, Distillation, Interscience Publ., Inc., New York, 1951, pp. 382 and 383.

NOMAN YUDKOFF, *Primary Examiner.*

GEORGE D. MITCHELL, W. L. BASCOMB,
*Assistant Examiners.*